United States Patent [19]

Husse et al.

[11] 3,964,309

[45] June 22, 1976

[54] DEVICE FOR DETERMINING MASS AIR FLOW IN A CONDUIT

[75] Inventors: Massimo Husse; Mauro Lagonigro, both of Turin, Italy

[73] Assignee: Fiat Societa per Azioni, Turin, Italy

[22] Filed: May 20, 1975

[21] Appl. No.: 579,285

[30] Foreign Application Priority Data
Aug. 1, 1974 Italy.................................. 69440/74

[52] U.S. Cl................................................ 73/194 A
[51] Int. Cl.²........................................... G01F 1/66
[58] Field of Search........................... 73/194 A, 24

[56] References Cited
UNITED STATES PATENTS
| | | | |
|---|---|---|---|
| 3,468,157 | 9/1969 | Burk et al................................ | 73/24 |
| 3,817,098 | 6/1974 | Brown....................................... | 73/194 A |

*Primary Examiner*—Charles A. Ruehl
*Attorney, Agent, or Firm*—Sughrue, Rothwell, Mion, Zinn & Macpeak

[57] ABSTRACT

An ultrasonic device for determining the air flow rate in a conduit, comprising a duct, which may form part of the conduit or may be connectable thereto, at each end of which is a respective enlarged cylindrical chamber communicating axially with the duct and housing a respective piezoelectric transducer. In use of the device the piezoelectric transducers both transmit ultrasonic signals towards each other along the duct and the air speed in the duct is determined by the difference in transit times of the ultrasonic signals in the two directions. The air flow through the chambers is largely radial and the piezoelectric transducers are located axially at positions where the air speed is very low to minimize disturbances thereto.

4 Claims, 1 Drawing Figure

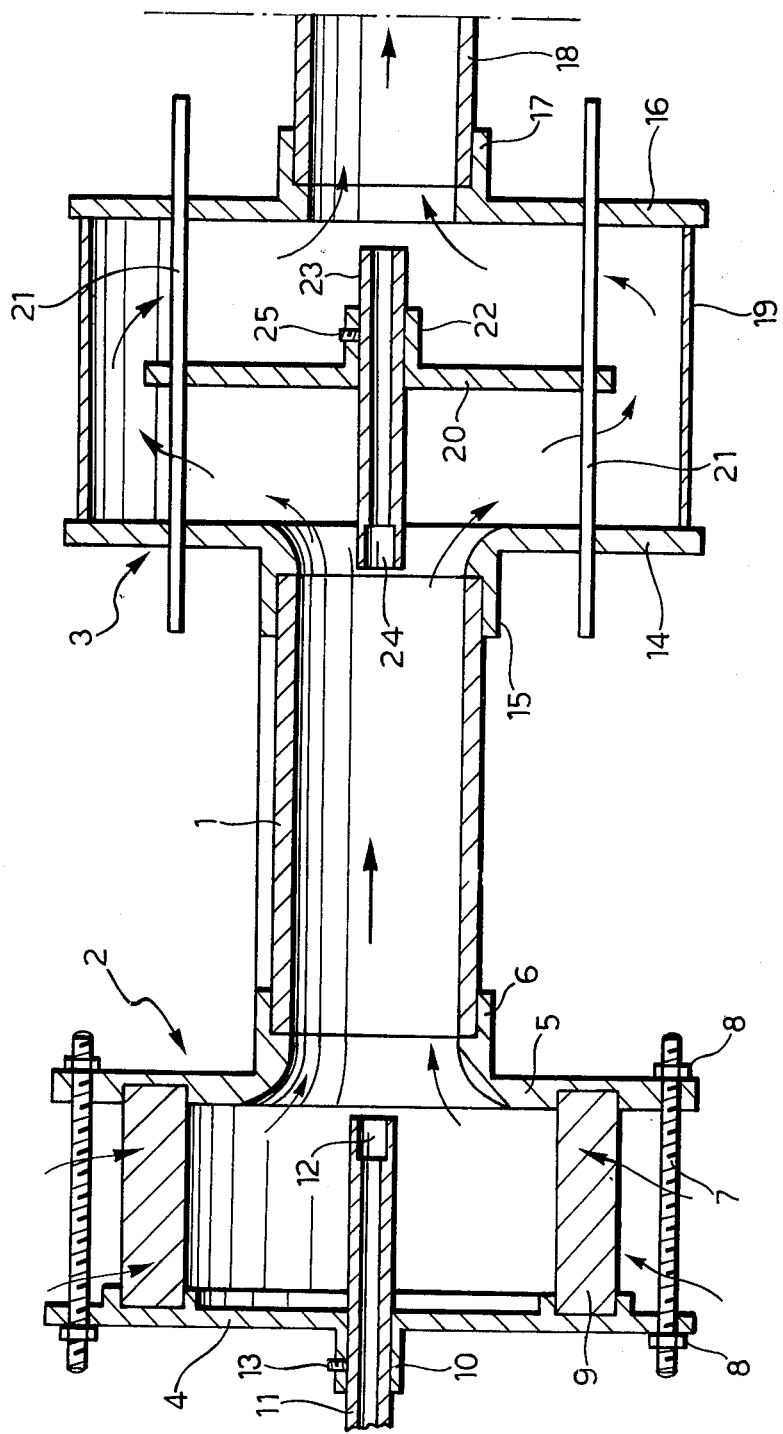

DEVICE FOR DETERMINING MASS AIR FLOW IN A CONDUIT

The present invention relates to devices for the determination of mass air flow in a conduit, and particularly to ultrasonic devices for determining mass air flow suitable for use in the induction manifold of an internal combustion engine. The general type of device to which the present invention relates comprises two ultrasonic piezoelectric transducers, each located near a respective end of a duct through which is passed the air flow to be determined, and an electronic circuit for processing the signals from the two transducers so as to calculate the amount of air which passes through the duct.

The presence of the two transducers adjacent the open ends of the duct can, however, cause the formation of vortices and turbulence in the air flowing through the duct, which may give rise to local variations resulting in inaccuracies in the measurement by influencing the signals of the two transducers.

The present invention seeks to overcome this disadvantage by providing a device of general type described above in which the formation of vortices and other turbulent movements of air flowing through the duct is reduced thereby increasing the reliability of accurate measurement of the air speed.

According to the present invention there is provided a device for the ultrasonic determination of the rate of flow of air through a conduit, such as the induction manifold of an internal combustion engine, of the type comprising a duct through which the air flow to be determined is passed, two piezoelectric transducers, one at each end of the duct, and an electronic circuit which computes the air flow from the transducer signals, characterized in that at the two ends of the duct and communicating therewith, there are located respective chambers of larger diameter than the duct, within which chambers the two piezoelectric transducers are located, one of the chambers having an opening so shaped that air flow from the opening to the duct takes place substantially radially with respect to the axis of the duct, and the other of the chambers having a baffle plate extending transversely with respect to the axis of the duct such that air flow through the said other chamber, at least in the region between the duct and the baffle plate takes place substantially radially with respect to the axis of the duct.

One embodiment of the invention will now be more particularly described, by way of example, with reference to the accompanying drawing, which is an axial section of an air conduit incorporating an embodiment of the invention.

Referring now to the drawing there is shown a duct 1, which is connected to (or alternatively may form part of) the induction manifold or an internal combustion engine, the air flow through which is to be determined: at the opposite ends of this duct there are located two chambers 2, 3, comprising substantially cylindrical bodies having a diameter greater than that of the duct 1.

The chamber 2, which is located at the inlet mouth of the duct 1 comprises a transverse flat circular wall 4 spaced from a transverse flat annular wall 5 by a cylindrically curved wall 9. The annular wall 5 has a hollow central boss 6 which forms a coupling to the duct 1: the two flat walls 4, 5 are held together with the curved wall 9 between them by threaded studs 7 and cooperating nuts 8. The curved wall 9 is made of porous material which serves as an air filter allowing air to enter the chamber 2 radially and pass axially through the boss 6 which defines the outlet from the chamber 2 and the inlet of the duct 1.

Aligned with the axis of the chamber 2 there is a tubular support 11 which carries at one end an ultrasonic piezoelectric transducer 12 which in operation of the device is used for the measurement of the air flow through the duct 1. The support 11 is carried in a sleeve 10, projecting axially from the outer face of the flat circular wall 4 of the chamber 2, and through which passes a screw 13 by means of which the tubular support 11 can be locked in any selected axial position to determine the most appropriate position for the transducer 12, that is the position at which it causes the least disturbance to the airflow from the chamber 2 into the duct 1.

The other chamber 3 consists of two flat annular walls 14 and 16 joined by a cylindrically curved wall 19. The flat annular wall 14 has a hollow boss 15 projecting axially from one face and forming a connection sleeve housing the end of the duct 1. Similarly, the flat annular wall 16 has a central hollow boss 17 forming a connection sleeve into which is fitted a pipe 18 leading to the engine.

Within the interior of the second chamber 3 there is a baffle plate in the form of a transverse disc 20, carried on axial guides 21 supported by the annular walls 14,16. The disc 20 has a central hollow boss 22 serving as a support sleeve for a tubular support 23 which carries at one end thereof a second ultrasonic piezoelectric transducer 24. The axial adjusted position of the support tube 23, and therefore of the transducer 24, is fixed by means of a radial screw 25 passing through the boss 22 into engagement with support 23. Adjustment to the axial position of the support 23 can be made to select the most suitable position for the transducer 24, at which it causes the least disturbance to the air flowing from the duct 1 into the chamber 3.

In each of the two chambers the majority of the air flow is radial, so that in the regions adjacent to the ends of the duct 1, where the two transducers 12, 24, are located, the speed of flow is always low as the major part of the air flows past in the annular space surrounding the transducers. The presence of the transducers thus does not give rise to the formation of vortices which might interfere with the accuracy of measurement of the mass air flow. The special conformation of the chambers facilitates the entry and exit of air to and from the duct 1, avoiding the formation of vortices in the main flow path and the formation of microvortices close to the walls.

The transverse baffle plate or disc 20 is adjustable axially along the axial guides 21 in order to select a position at which the vibrations due to successive induction strokes cause the least disturbance on the performance of the piezoelectric transducer 24.

We claim:

1. In a device for the ultrasonic determination of air speed through a conduit, such as the induction manifold of an internal combustion engine, comprising:
    a duct through which passes the air flow to be determined, and
    two ultrasonic piezoelectric transducers, one at each end of said duct, adapted to receive and provide signals for computing the air speed in said duct, the improvement wherein:
said transducers are respectively located in first and second chambers, one at each end of said duct and communicating therewith, said chambers having a greater diameter than said duct,
said first chamber having a peripheral opening such that air flows through said chamber to said duct substantially radially with respect to the axis of said duct, and
a baffle plate in said second chamber, said baffle plate extending transverse the axis of said duct such that air flow through said second chamber, at least in the region between said duct and said baffle plate, is substantially radial with respect to said axis of said duct.

2. The device of claim 1, wherein there are provided two tubular supports, one for each of said two piezoelectric transducers, a first of said tubular supports being carried by a wall of said first chamber which extends substantially radially with respect to said axis of said duct, and the second of said tubular supports being carried by said baffle plate.

3. The device of claim 2 further comprising means mounting said baffle plate for adjustment axially of said duct.

4. The device of claim 1, wherein said two chambers are substantially cylindrical with their axes aligned with the axis of said duct, an annular air filter being incorporated in said peripheral opening in said first chamber.

* * * * *